No. 786,074.                                                     Patented March 28, 1905.

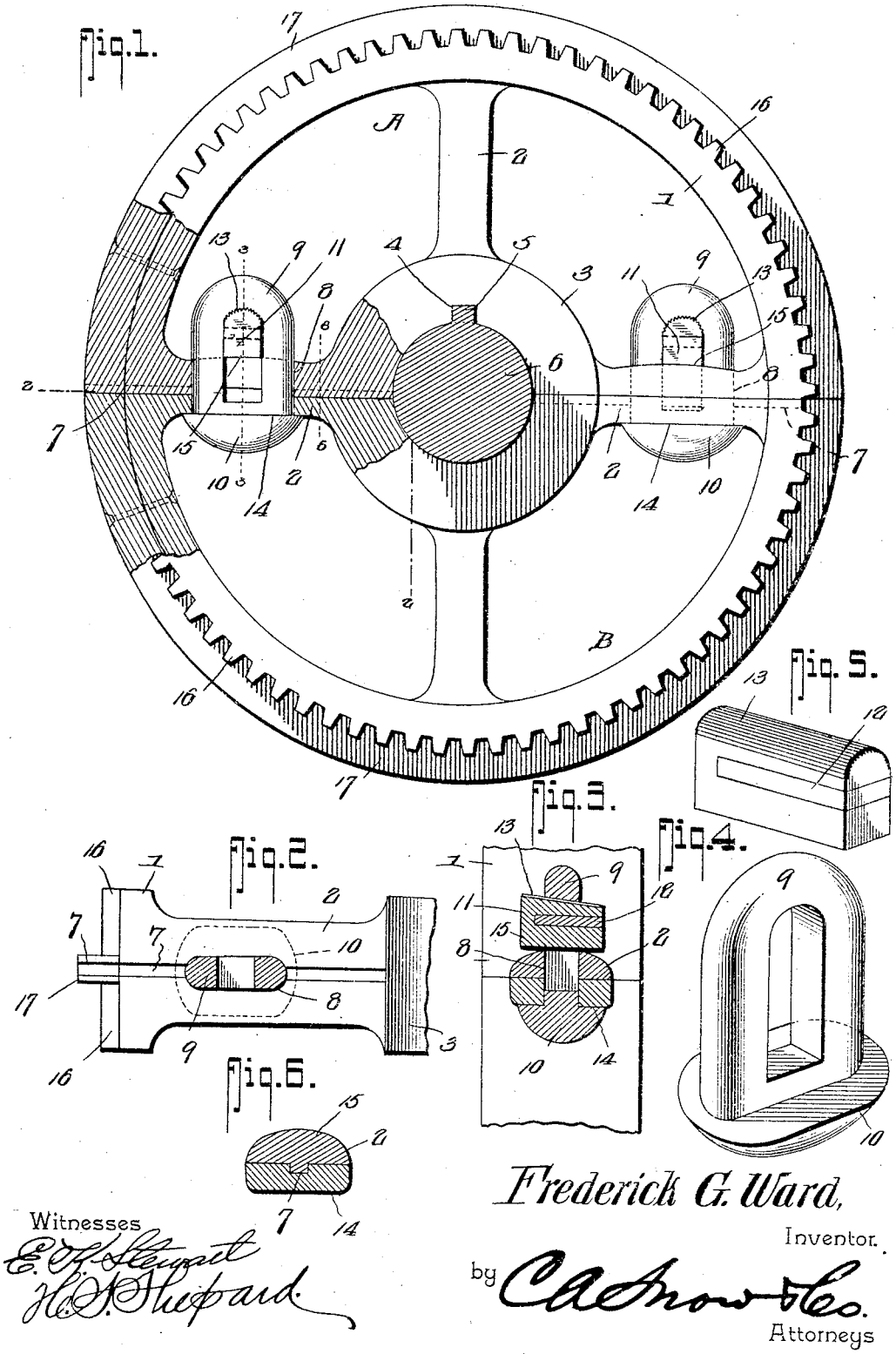

UNITED STATES PATENT OFFICE.

FREDERICK G. WARD, OF PITTSBURG, PENNSYLVANIA.

SECTIONAL GEAR-WHEEL.

SPECIFICATION forming part of Letters Patent No. 786,074, dated March 28, 1905.

Application filed August 18, 1904. Serial No. 221,276.

*To all whom it may concern:*

Be it known that I, FREDERICK G. WARD, a citizen of the United States, residing at Pittsburg, in the county of Allegheny and State of Pennsylvania, have invented a new and useful Sectional Gear-Wheel, of which the following is a specification.

The object of the present invention is to provide certain new and useful improvements in split or sectional wheels and to facilitate the fitting and clamping thereof upon axles and shafts, it being particularly designed to adapt the invention for use in connection with the axles of electric vehicles.

Another object of the invention is to obviate the use of bolts, nuts, washers, rivets, and the like and at the same time to obtain a clamping action throughout the entire lengths of the wheel-sections, so as to secure a rigid connection with the axle or shaft and at the same time to secure a strong and durable connection between the wheel-sections and prevent looseness therebetween.

It is furthermore designed to embody the invention in the form of a gear-wheel and to provide the same with means to coöperate with another gear or pinion to prevent lateral play or end lash of the gear.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a side elevation of a gear-wheel embodying the features of the present invention, parts being broken away to show the means for clamping the wheel-sections together. Fig. 2 is a detail cross-sectional view taken on the line 2 2 of Fig. 1. Fig. 3 is a similar view taken on the line 3 3 of Fig. 1. Fig. 4 is a detail view of one of the fastening-links. Fig. 5 is a detail perspective view of one of the link-locking wedges. Fig. 6 is a detail cross-sectional view on the line 6 6 of Fig. 1.

Like characters of reference designate corresponding parts in each and every figure of the drawings.

The present wheel is formed in duplicate half-sections A and B, each of which consists of a rim 1, spokes or radial arms 2, and a hub-section 3, all of which are cast integrally. Each intermediate spoke or arm is complete in itself, while each terminal arm is but half of the complete arm in order that when corresponding terminal arms are brought together a complete arm of normal size may be formed. The hub portion of one wheel-section is provided with an internal longitudinal groove or keyway 4, designed to receive the key 5 upon the shaft or axle 6, and thereby interlock the gear and shaft for simultaneous rotation. Furthermore, the meeting faces of the terminal arms or spokes are provided with a longitudinal tongue-and-groove connection 7, so as to effectually aline the wheel-sections when brought together and to prevent lateral separation thereof independently of the means for clamping the sections together. In addition to the tongue-and-groove connection the corresponding terminal arms or spokes are provided with corresponding longitudinal openings 8, which have rounded end walls adjacent the hub and the rim of the wheel.

After the wheel-sections have been assembled upon the shaft or axle a longitudinally-slotted link 9 is thrust through the corresponding openings 8 of each pair of terminal arms or spokes, said link being provided at one end with an enlarged head 10, forming an annular shoulder to strike one of the arms, and thereby limit the introduction of the link into the arms. The other end of the link of course projects at the opposite side of the arm, and a wedge 11 is driven through that part of the slot in the link which is exposed at said opposite side of the arm. This wedge is split longitudinally, and a yieldable cushion 12—such, for instance, as a strip of copper—is fitted between the sides of the wedge, so as to prevent crushing thereof when being driven into the link. One of the external longitudinal edges 13 of the wedge is rounded, so as to fit the concaved end wall of the slot in the link, and is also serrated, so as to bite into said end wall of the slot, and thereby anchor the wedge against working loose without the employment of extraneous fastenings.

It will here be explained that what will be termed the "back faces" 14 of the terminal arms of one wheel-section are flat in order that the heads of the links may fit flat against said faces, and the length of each head is substantially that of the back face of the arm in order that the head may engage the arm throughout the entire length thereof, or, in other words, extend as near as possible to the hub and the rim. As shown in Fig. 1 of the drawings, the back faces 15 of the terminal arms of the other wheel-section are convexed longitudinally, so as to reinforce the same, and as the wedges engage across the middles of these convexed portions the strain of the wedges is distributed throughout the entire lengths of the arms. It will now be understood that the pressure of the head and the wedge are applied throughout the entire lengths of the backs of the respective arm-sections, whereby the latter are effectually clamped together at the most essential points—that is to say, at the hub and at the rim—thereby to prevent springing of the hub and consequent looseness thereof on the shaft or axle. Furthermore, as best shown in Fig. 3, it will be noted that the sides of the link are externally convexed, so as to fit the concaved end walls of the slots in the arm-sections and to extend as close as possible to the hub and rim. The length of the wedge or key 11 is just that of the width of the arm, so as not to project beyond the arm when finally set in place.

From the foregoing description it will be seen that each fastening of the present device consists of but two members—viz., the link and the key or wedge—thereby obviating bolts, nuts, nut-locks, washers, and the like and at the same time producing a strong, durable, and efficient means for clamping together the wheel-sections. Moreover, the head of each link forms a stop to insure the setting of the link to its proper position.

As best shown in Fig. 3 of the drawings, the rim is provided with two sets of gear-teeth 16, separated by an annular groove or channel, within which is secured an annular flange 17, preferably riveted to the rim of the wheel and projected a suitable distance beyond the crown of the teeth. The purpose of this flange is to fit within a corresponding groove in another gear or pinion (not shown) which is in mesh with the present gear, thereby to prevent lateral play or end lash of the gear.

Having thus described the invention, what is claimed, and desired to be secured by Letters Patent, is—

1. A divided wheel having its sections provided with corresponding arms to lie in mutual engagement and provided with corresponding mortises, a slotted link fitted in the mortises and provided with a fixed head engaging the back of one of the arms and its slotted portion projected at the back of the other arm, and a key driven through the slotted portion of the link and in engagement with the back of the adjacent arm.

2. A divided wheel having its sections provided with corresponding arms to lie in mutual engagement and provided with corresponding mortises, a slotted and headed link fitted in the mortises with its head engaging the back of the adjacent arm and its slotted portion projected at the back of the other arm, a bifurcated key driven into the slotted portion of the link and in engagement with the back of the adjacent arm, and a yieldable cushion fitted in the bifurcation of the key to prevent crushing thereof when being driven into place.

3. A divided wheel having its sections provided with corresponding arms to lie in mutual engagement and provided with corresponding mortises, a slotted and headed link fitted in the mortises with its head engaging the back of the adjacent arm and its slotted portion projected at the back of the other arm, a bifurcated key driven into the slotted portion of the link and in engagement with the back of the other arm, and copper strip fitted in the bifurcation of the key to form a cushion to prevent crushing of the key when being driven into place.

4. A divided wheel having its sections provided with corresponding arms to lie in mutual engagement and provided with corresponding mortises, a slotted link fitted in the mortises and provided with a fixed head engaging the back of one of the arms and extending throughout approximately the entire length thereof from the hub to the rim of the wheel, the slotted portion of the link being projected at the back of the other arm, and a key driven into the slot of the link and engaging the back of the other arm.

5. A divided wheel having its sections provided with corresponding arms to lie in mutual engagement and provided with corresponding mortises, the back of one of the arms being flat and the back of the other arm being convexed longitudinally from end to end thereof, a slotted and headed link fitted in the mortises with its head fitting flat against the back of the arm having the flat back and extending throughout approximately the entire length of the arm, the slotted portion of the link being projected at the back of the other arm, and a key driven into the slot of the link and engaging across the convexed back of said other arm.

6. A divided wheel having its sections provided with corresponding arms to lie in mutual engagement and provided with longitudinal corresponding mortises with their end walls concaved, a slotted link fitted in the mortises and provided with a head engaging the back of one of the arms, the slotted portion of the link being projected at the back of the other arm, opposite edges of the link being convexed externally to fit the concaved end walls of the mortises, and a key driven through the slotted portion of the link and engaging the back of said other arm.

7. A divided wheel having its sections provided with corresponding arms to lie in mutual engagement, means for connecting the sections, each section being provided with two peripheral sets of gear-teeth separated by an annular space, and a flange secured to the rim of each section between the sets of teeth thereon and projected beyond the crowns of said teeth, the ends of the flanges being abutted and provided with a tongue-and-groove connection to produce a continuous annular flange.

8. A divided wheel having its sections provided with corresponding arms to lie in mutual engagement and provided with a tongue-and-groove connection, two sets of gear-teeth upon the rim of each section and separated by an interspace, a flange extending throughout the rim of each section and projected beyond the crowns of the teeth thereof, the corresponding ends of the two flanges being abutted to form a continuous annular flange and the tongue-and-groove connection of the arms extending throughout the widths of the flanges, and means carried by the arms to connect the sections.

In testimony that I claim the foregoing as my own I have hereto affixed my signature in the presence of two witnesses.

FREDERICK G. WARD.

Witnesses:
MARY A. JONES,
J. B. CROOKS.